United States Patent [19]
Miyamoto et al.

[11] 3,973,233
[45] Aug. 3, 1976

[54] CIRCUIT INTERRUPTER

[75] Inventors: Toshio Miyamoto; Teijiro Mori, both of Amagasaki; Kiyoshi Matsuura; Bungo Hara, both of Fukuyama, all of Japan

[73] Assignee: Mitsubishi Denki Kabushiki Kaisha, Tokyo, Japan

[22] Filed: Sept. 13, 1974

[21] Appl. No.: 506,191

[52] U.S. Cl. .............................. 337/118; 337/159; 335/35
[51] Int. Cl.² ......................................... H01H 87/00
[58] Field of Search ............ 335/6, 23, 35, 37, 174; 337/114, 116, 118, 158, 159, 161, 162

[56] References Cited
UNITED STATES PATENTS

| | | |
|---|---|---|
| 3,753,190 | 8/1973 | Ito et al. .......................... 337/118 X |
| 3,873,791 | 3/1975 | Hurtle ............................. 337/114 X |

Primary Examiner—George Harris
Attorney, Agent, or Firm—Wenderoth, Lind & Ponack

[57] ABSTRACT

A circuit interrupter has a pair of contacts, a self-restoring type current limiting element and a first electromagnetic trip device serially interconnected. The current limiting element is connected across a parallel connected resistor and a second electromagnetic trip device. Both trip devices have a common magnetic circuit including a single stationary core and a single movable iron piece. The first trip device responds to a shortcircuiting current flowing through it to open the contacts but the second trip device is operative to open the contacts only after the current limiting element has performed the operation of limiting a shortcircuiting current.

5 Claims, 14 Drawing Figures

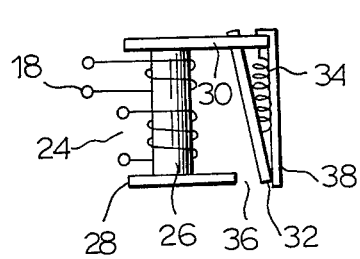
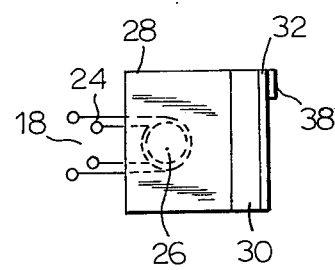
FIG.4a  FIG.4b
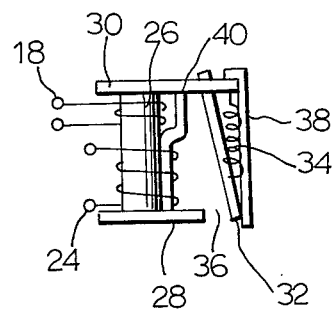
FIG.5
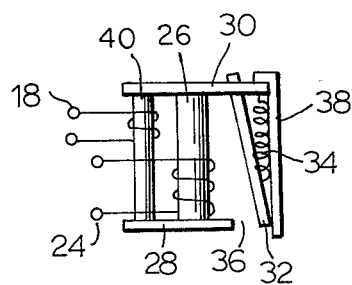
FIG.6

CIRCUIT INTERRUPTER

BACKGROUND OF THE INVENTION

This invention relates to improvements in a circuit interrupter including a self-restoring type current limiting device.

In circuit interrupters including a conventional self-restoring type current limiting device, it has been already proposed to connect a resistor across the current limiting device in order to reduce the severity of the overload imposed upon the latter. If tqe current limiting device were to be operated with a current below its threshold current due to some fault, there might be a danger that the resistor connected across the device would be burnt out.

Accordingly it is an object of the present invention to overcome the problem of the prior art circuit interrupters as above described by the provision of safety means for the abovementioned resistor connected across the self-restoring type current limiting device of circuit interrupters.

It is another object of the present invention to provide a new and improved circuit interrupter comprising a self-restoring type current limiting device and means for preventing flashover from occurring in the circuit interrupter upon interrupting a short-circuiting current.

SUMMARY OF THE INVENTION

The present invention provides a circuit interrupter comprising, in combination, at least one pair of relatively separable contacts, a self-restoring type current limiting element and first electromagnetic trip means connected in series circuit relationship with the contacts, a resistor connected across the self-restoring type current limiting element, and second electromagnetic trip means connected in a circuit with the resistor, the first and second electromagnetic trip means being operative independently to trip the contacts, the second electromagnetic trip means being operative only in response to the operation of the self-restoring type current limiting element.

Preferably the first and second electromagnetic trip means includes a common magnetic circuit including a single stationary iron core and a single movable iron piece.

In order to prevent the occurrence of flashover upon interrupting a shortcircuiting current, the self-restoring type current limiting element along with the parallel resistor may be connected to an interrupting unit including the contacts and the first electromagnetic trip means outside thereof so that the second electromagnetic trip device is connected to the contacts without the resistor being interposed therebetween.

BRIEF DESCRIPTION OF THE DRAWINGS

The present invention will become more readily apparent from the following detailed description taken in conjunction with the accompanying drawings in which:

FIG. 4a is a schematic side elevational view of one portion of a circuit interrupter actually embodying the circuit configuration shown in FIG. 2;

FIG. 4b is a schematic plan view of the arrangement shown in FIG. 4a;

FIG. 5 is a view similar to FIG. 4a but illustrating a modification of the arrangement shown in FIGS. 4a and 4b;

FIG. 6 is a view similar to FIG. 4a but illustrating another modification of the arrangement shown in FIGS. 4a and 4b;

DESCRIPTION OF THE PREFERRED EMBODIMENTS

Figure 1:
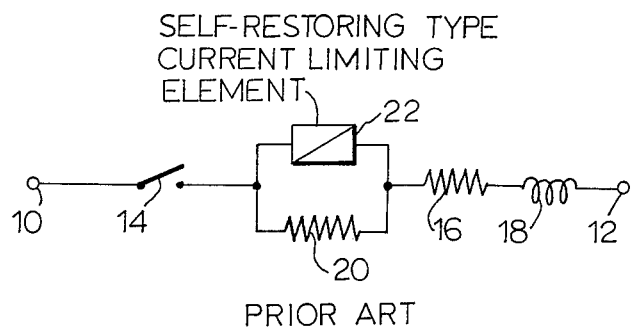
FIG. 1 is a schematic circuit diagram of a circuit interrupter constructed in accordance with the principles of the prior art.

Referring now to the drawings and FIG. 1 in particular, there is illustrated a conventional circuit interrupter including a self-restoring type current limiting element. The arrangement illustrated comprises a pair of terminals 10 and 12, a pair of relatively separable contacts 14 connected to one of the terminals, in this case, the terminal 10, and a thermally responsive trip device 16 connected to an electromagnetic trip device 18 subsequently connected to the other terminal 12. The trip devices 16 and 18 have well known constructions. Connected between the set of contacts 14 and the thermally responsive trip device 16 is a resistor 20 having connected thereacross a self-restoring type current limiting element 22 which may be simply called a "current limiting element" hereinafter. As disclosed and claimed in Japanese patent publication No. 10,643/1962, a self-restoring type current limiting element includes an amount of a self-restoring type current limiting material in the form of a solid or a liquid at room temperature, for example, sodium or potassium responsive to a flow of shortcircuiting current therethrough to be evaporated to present a high resistance to the shortcircuiting current thereby to limit the current. Thereafter the evaporated material is returned to its original solid or liquid state to restore the electric conductivity.

In operation, a flow of high shortcircuiting current through the circuit interrupter causes the current limiting element 22 to be evaporated to present a high resistance to the shortcircuiting current to limit the current while at the same time commutating the current into the resistor 20. The resistor 20 permits the commutated current having a magnitude as determined by the magnitude of resistance thereof to flow into tqe trip dn5rlns 16 and 18 so that the electromagnetic trip device 18 opens the contacts 14 to trip the circuit interrupter to its open position.

If, due to some fault, the current limiting element 22 were to be operated with a low current less than a threshold current below which the element would not be operated then this might cause a danger that the resistor 20 connected across the current limiting element 22 is burnt out. More specifically, the current limiting element 22 has an amount of a self-restoring type current limiting material such as sodium or potassium sealed under a high pressure therein through a pressurized gas or spring means or the like. If the pressure on the current limiting material decreases due to leakage of the gas or damage to the spring means then the operating current thereof is abruptly reduced in magnitude. Under these circumstances, if the operating current thus reduced flows through the circuit interrupter then the current limiting element 22 limits the current to cause the current to flow through the resistor 20 in parallel thereto. In that event, the electromagnetic trip device 18 is not brought into operation and instead the thermally responsive trip device 16 is actuated to trip the circuit interrupter to its open position. In the meanwhile the resistor 20 may be burnt out.

The interrupting operation performed by the arrangement as shown in FIG. 1 will now be described in more detail with reference to FIG. 3 wherein currents flowing through various components of the circuit interrupter are plotted on the abscissa against time on the ordinate. If a current having a magnitude of $i_1$ flows through the circuit interrupter, then the thermally responsive trip device 16 senses that current to open the contacts 14 at a time point of $t_1$ as shown by curve $a$ depicting the interrupting characteristic exhibited by the circuit interrupter including both the thermally responsive trip device 16 and the electromagnetic trip device 18. If a current in excess of a magnitude of $i_4$ flows through the circuit interrupter then the electromagnetic trip device 18 quickly senses that current before the thermally responsive trip device 16 senses it.

Figure 3:
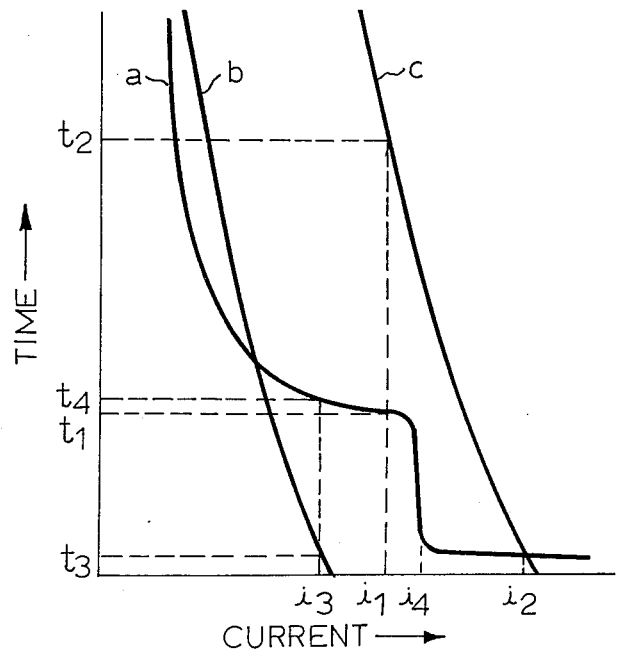
FIG. 3 is a graph illustrating the characteristics of the arrangement shown in FIG. 2.

Curve $c$ shown in FIG. 3 describes the current limiting characteristic of the current limiting element 22 illustrating the relationship between the current flowing through the element 22 and a time point where the element 22 is initiated to limit that current. For example, if a current having a magnitude of $i_1$ flows through the current limiting element then the latter is initiated to limit the current at a time point of $t_2$. The current limiting element 22 is generally responsive to a flow of current therethrough having a magnitude equal to or higher than the magnitude represented by a point of intersection of curves $a$ and $c$, i.e. greater than $i_2$, to be actuated to limit the current before the associated contacts are opened.

FIG. 3 further shows curve labelled $b$ depicting the current limiting characteristic of the current limiting element 22 after the magnitude of a current at which the element 22 is initiated to limit the current has been decreased due to an accidental fault such as previously described. For example, if a current having a magnitude of $i_3$ flows through the circuit interrupter then the current limiting element 22 is initiated to limit the current after the lapse of a time interval of $t_3$ to commutate the current into the resistor 20 connected in parallel thereto. The commutated current is limited to a magnitude as determined by the magnitude of resistance 14 while it flows through both trip devices 16 and 18. Under these circumstances, the electromagnetic trip device 18 remains inoperative so that the current continues to flow through the thermally responsive trip device 16 until a time point $t_4$ at which the thermally responsive trip device 16 is operated in response to that current to trip the circuit interrupter to its open position.

The resistor 20 connected across the current limiting element 22 has been originally designed and constructed such that a current is permitted to flow through the resistor for an extremely short time interval until the electromagnetic trip device 18 is actuated. Therefore it is apparent that, when a current having a magnitude of $i_3$ equal to several times, for example, 4.5 times the rated current of the circuit interrupter continues to flow through the resistor 20 for a long time interval up to the time point $t_4$, this will result in the burning out of the resistor 22.

The present invention contemplates the provision of means capable of being called a safety device ensuring that the resistor 20 is prevented from being burned out due to a decrease in a current at which the current limiting element is initiated to perform the current limiting operation.

Figure 2:
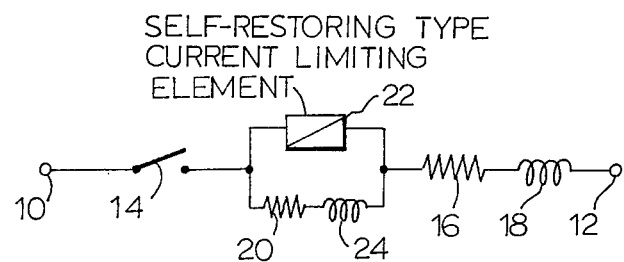
FIG. 2 is a schematic circuit diagram of a circuit interrupter constructed in accordance with the principles of the present invention.

Referring now to FIG. 2 wherein like reference numerals designate the components identical to those shown in FIG. 1, there is illustrated in a schematic circuit diagram, a circuit interrupter constructed in accordance with the principles of the present invention. The arrangement illustrated is substantially similar to that shown in FIG. 1 excepting that in FIG. 2, the current limiting element 22 has connected thereacross a series combination of the resistor 20 and another electromagnetic trip device 24. The electromagnetic trip device 24 called a "second" electromagnetic trip device is adapted to perform the trip operation with a current less than the current to which the electromagnetic trip device 18 called a "first" electromagnetic trip device is responsive to trip the circuit interrupter, and immediately after the current limiting element 20 has performed the operation of limiting a high current such as a shortcircuiting current. The electromagnetic trip device 24 is called an "on-limitation electromagnetic trip device" hereinafter.

Upon a flow of shortcircuiting current through the arrangement of FIG. 2 the magnitude of which is insufficient to actuate the current limiting element 22, the electromagnetic trip device 18 performs the trip operation as in the normal mode of operation. The on-limitation electromagnetic trip device 24 is designed and constructed such that, upon a flow of high shortcircuiting current through the arrangement of FIG. 2 sufficient to operate the current limiting element 22, it is responsive to a current flowing through the resistor 20 to be immediately operated to trip the interrupter to its open position. This ensures that the resistor 20 in parallel to the current limiting element 22 is prevented from being burned out. With the current limiting element 22 maintained properly operative, it is to be understood that a flow of high shortcircuiting current through the arrangement of FIG. 2 results in the actuation of either one of the electromagnetic trip devices 18 and 24.

Both electromagnetic trip devices 18 and 24 may be formed into separate structures which are in turn operatively coupled to a toggle mechanism disposed in the circuit interrupter. This measure is disadvantageous in that the resulting circuit interrupter becomes large-sized. Therefore both trip devices can be preferably formed into a unitary structure such as shown in FIG. 4.

As shown in FIG. 4, both electromagnetic trip devices have respective windings inductively disposed around a single stationary iron core 26. The windings are designated by the same reference numerals as the associated electromagnetic trip devices. That is, the windings 18 and 24 are provided for the trip devices 18 and 24 respectively. The iron core 26 is provided at the opposite ends with a pair of magnetic pole pieces 28 and 30 in the form of rectangular plates. One of the pole pieces, in this case the upper pole piece 30, has one side portion jutting beyond the other pole piece and a movable iron piece 32 is pivotably mounted thereon. A spring 34 has one end anchored to the movable iron pieces 32 and the other end to the end of the jutting side portion of the pole piece 30 to normally bias the movable iron piece 32 away from the lower pole piece 28 to form an air gap 36 therebetween. The movable iron piece 32 normally abuts against a stop 38 attached to the end of the jutting side portion of the upper pole piece 30. The components 26, 30, 32, 36 and 26 form a magnetic circuit common to both electromagnetic trip devices 18 and 24.

With a current in excess of a predetermined magnitude flowing through either one of the electromagnetic trip devices or their windings 18 and 24, the movable iron piece 32 is attracted by the lower pole piece 28. During this attraction thereof the movable iron piece 32 actuates a trip lever (not shown) disposed in the circuit interrupter to open the contacts 14 (see FIG. 2).

The construction by which both electromagnetic trip devices 18 and 24 have the common stationary iron core 26 and the single movable iron piece 32 is advantageous as compared with that in which the cores are provided independently of each other but it is required to make the operating current for the on-limitation electromagnetic trip device 24 lower than that for the electromagnetic trip device 24. To this end, the winding 18 may be given an increased number of turns, on the one hand and it is preferable to decrease the dimension of the on-limitation electromagnetic trip device itself, on the other hand. Therefore the on-limitation electromagnetic trip device 24 has a limit as to the increase in the number of turns of its winding.

Under these circumstances, both electromagnetic devices 18 and 24 can be preferably constructed as shown in FIG. 5 or 6 wherein like reference numerals designate the components identical or similar to those shown in FIGS. 4a and 4b.

In FIG. 5, the first electromagnetic trip device has the winding 18 thereof inductively disposed around the stationary iron core 26 alone while the second or on-limitation electromagnetic trip device has the winding 24 thereof inductively disposed around both the iron core 26 and a magnetic shunt plate 40 extending between the lower and upper pole pieces 28 and 30 respectively. The magnetic shunt plate 40 includes one portion in contact with that portion of the iron core 26 forming an iron core for the trip device 24 and the other portion spaced from that core portion forming an iron core for the trip device 18.

In FIG. 6, the magnetic shunt plate 40 is disposed in spaced parallel relationship with the stationary iron core 26 between the magnetic pole pieces 28 and 30. Then the first electromagnetic trip device has the winding 18 thereof inductively disposed around the magnetic shunt plate 40 while the on-limitation electromagnetic trip device has the winding 24 thereof inductively disposed around the iron core 26.

In other respects, the arrangement as shown in each of FIGS. 5 and 6 is identical in construction to that illustrated in FIGS. 4a and 4b.

In the arrangements as shown in FIGS. 5 and 6, the magnetic flux resulting from the electromagnetic trip device 18 flows partly through a closed loop including the iron core 26, the pole piece 30, the movable iron piece 32, the air gap 36 and the pole piece 28. The remaining portion of the magnetic flux flows through the magnetic shunt plate 40 and can form the greater part thereof. Under these circumstances, the force exerted by the spring 34 is decreased. As a result, the operating current for the electromagnetic trip device 18 can be equal to that required for the arrangement as shown in FIG. 1 while the on-limitation electromagnetic trip device can operate on a decreased operating current without the necessity of increasing greatly the number of turns of the winding thereof.

In summary, the present invention comprises a resistor connected across a self-restoring type current limiting element and an on-limitation electromagnetic trip device serially connected with the resistor across the current limiting element and having a smaller operating current than a normal electromagnetic trip device. Thus even if the self-restoring type current limiting element, operates unusually thereby limiting the current below its threshold current due to some accidental fault, the present circuit interrupter operates safely.

Also the electromagnetic trip device 18 and the on-limitation electromagnetic trip device 24 include the common stationary iron core 26 and the associated movable iron piece 32. Furthermore, the stationary iron core 26 can be operatively associated with the magnetic shunt plate 40. Therefore the operating characteristics can readily be compromised between both trip devices resulting in circuit interrupters which are small-sized and inexpensive.

Figure 7:
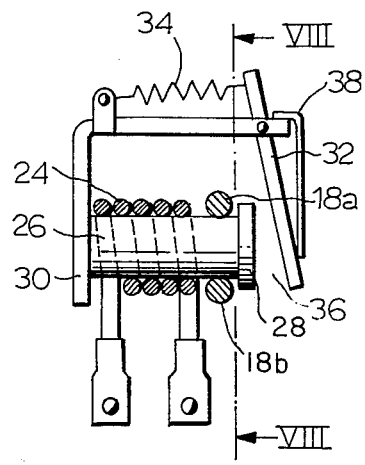
FIG. 7 is a schematic side elevational view, partly in section, of one portion of another circuit interrupter actually embodying the circuit configuration shown in FIG. 2.
Figure 8:
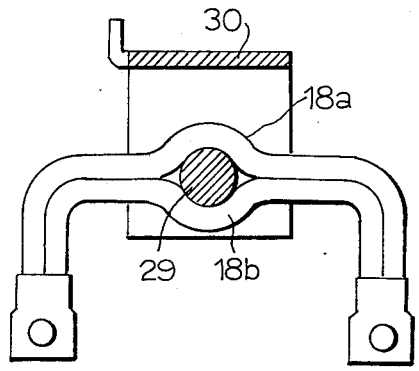
FIG. 8 is a sectional view taken along the line VIII—VIII of FIG. 7.

Referring now to FIGS. 7 and 8 wherein like reference numerals designate the components corresponding or similar to those shown in FIGS. 4a and 4b, there is illustrated another embodiment of the present invention. The arrangement illustrated comprises a single stationary iron core 26, a first winding 18a–18b inductively disposed around the iron core 26, and a second winding 24 inductively disposed around the iron core 26. The first winding is provided for the electromagnetic trip device 18 and is formed of a main conductor 18a and a shunt conductor 18b electrically insulated from each other and disposed in juxtaposed relationship with the iron core 26 therebetween. The second winding is provided for the on-limitation electromagnetic trip device 24 and includes several convolutions wound around the iron core 26.

A combined pole piece and yoke member 30 having an L shape is attached to one end of the iron core 26 and a pole piece 28 is attached to the other end of the iron core 26. A movable iron piece 32, a spring 34 and a stop 38 are disposed around the stationary iron core 26 in a similar manner as above described in conjunction with FIGS. 4a and 4b to form a magnetic circuit including the iron core 26, the L-shaped member 30, the movable iron piece 32, an air gap 36 and a pole piece. However the movable iron piece 32 is adapted to be attracted by the end face of the pole piece 28 rather than by the lateral edge thereof.

As in the arrangement shown in FIGS. 4a and 4b the main winding conductor 18a, the stationary iron core 26, the combined pole piece and yoke member 30, the movable iron piece 32 and the pole piece 28 form the electromagnetic trip device 18 while the winding 24, the stationary iron core 26, the L-shaped member 30, the movable iron piece 32 and the pole piece form the on-limitation electromagnetic trip device 24.

In operation a load current flowing through the first winding 18a–18b is divided into two current portions flowing through the main and shunt conductors 18a and 18b respectively. That current portion flowing through the main conductor 18a forms a magnetic flux flowing through the closed loop magnetic circuit as above described and when the current portion exceeds a predetermined magnitude, the movable iron piece 32 is attracted by the iron core 26. This causes the contacts 14 (see FIG. 2) to be opened through a tripping mechanism (not shown).

It is to be noted that the current portion flowing through the shunt conductor 18b forms no magnetic flux tending to attract the movable iron piece 32 by the iron core 26.

By properly selecting the force exerted by the spring 34, the electromagnetic trip device 18 can be operated with a high current. In addition, by properly selecting the number of turns of the second winding 24, the on-limitation electromagnetic trip device 24 can be operated with a low current. In other words, the on-limitation electromagnetic trip device 24 meets the requirement that it should perform the tripping operation with a current considerably less than the operating current for the electromagnetic trip device 18.

In summary, the embodiment of the present invention as shown in FIGS. 7 and 8 includes the first winding for the electromagnetic trip device 18 and the second winding for the on-limitation electromagnetic trip device 24 inductively disposed around the common stationary iron core with one portion of a load current flowing through the first winding. Therefore the on-limitation electromagnetic trip device 24 can operate with a smaller operating current than the electromagnetic trip device 18 whereby the arrangement as shown in FIGS. 7 and 8 exhibits the same advantages as above described in conjunction with FIGS. 4a and 4b, FIG. 5 and FIG. 6.

In addition, the arrangement as shown in FIGS. 7 and 8 is advantageous in that, by changing the ratio of a cross sectional area between the main and shunt conductors, the operating current necessary for operating the first electromagnetic trip device can be varied.

Figure 9:
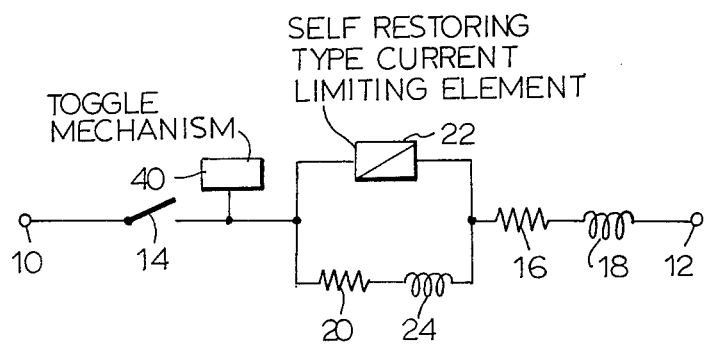
FIG. 9 is a schematic circuit diagram useful in explaining improvements in the arrangement shown in FIG. 2.

Referring now to FIG. 9, there is illustrated an arrangement different from that shown in FIG. 2 only in that in FIG. 9 a toggle mechanism 40 is operatively coupled to a pair of contacts 14 between the latter and the parallel connected self-restoring type current limiting element 22 and resistor 20 and the on-limitation electromagnetic trip device 24 serially interconnected. It will readily be understood that the contacts 14, the combination of components 20, 22 and 24, a thermally responsive trip device 16 and an electromagnetic trip device 18 may be interconnected in any desired order as long as they are disposed in a series circuit relationship. Upon assembling those components into a circuit interrupter, it is preferable to dispose the current limiting element 22 and the parallel resistor 20 on the rear surface of the circuit interrupter while disposing both electromagnetic trip devices 18 and 24 on a common stationary iron core in order to make the circuit interrupter small-sized.

As in the arrangement of FIG. 2, a flow of high short-circuiting current through the arrangement of FIG. 9 can cause the first electromagnetic trip device 18 to trip the circuit interrupter to its open position. Alternatively, the second or on-limitation electromagnetic trip device 24 can be operated to trip the interrupter to its open position after the current limiting element 22 has performed the operation of limiting the shortcircuiting current. In each case, the current limiting element 22 has a high voltage of L di/dt developed thereacross where L represents an inductance exhibited by the associated circuit including an electric source, a load etc. and di/dt represents the rate of current limitation provided by the current limiting element 22. This high voltage may cause a danger that any one or more of the associated components will be subject to a flashover dependent upon the position or positions thereof relative to the current limiting element 22.

Figure 10:
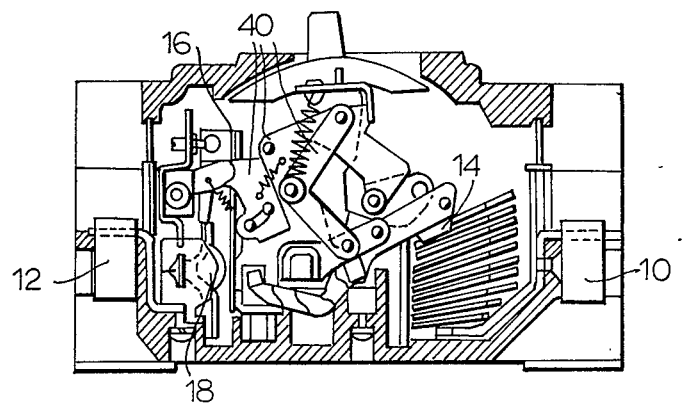
FIG. 10 is a schematic side elevational view, partly in section, of a conventional interrupter illustrating the internal structure thereof.

This will now be described with reference to FIG. 10 wherein there is illustrated the internal structure of a circuit interrupter generally employed at present. In FIG. 10 like reference numerals designate the components identical to those shown in FIG. 9.

In all circuit interrupters, the contacts 14 are connected to a toggle mechanism 40 through the metallic connection as shown in FIG. 10 which has a substantially equal electric potential to the toggle mechanism. In the arrangement of FIG. 9, the high voltage developed across the current limiting element 22 upon limiting a current is applied across the thermally responsive trip device 16 and the contacts 14 or the toggle mechanism 40. Also the thermally responsive trip device 16 is disposed in the proximity of the toggle mechanism 40 and an electrically conductive gaseous fluid at a high temperature is formed around the trip device 16 and the toggle mechanism 40 upon limiting a shortcircuiting current. This fluid may cause the occurrence of flashover across the thermally responsive trip device 16 and the toggle mechanism 40.

Further, it is difficult to maintain the thermally responsive trip device electrically insulated from the toggle mechanism because the two are close to each other as above described. Maintaining of the good insulating relationship between the thermally responsive trip device and the toggle mechanism has not been previously accomplished because circuit interrupters are required to be constructed so as to be small-sized and inexpensive.

The present invention also contemplates providing effective means for preventing flashovers such as above described without the necessity of much change of the arrangement and relative positions of the components of the circuit interrupters.

Figure 11:
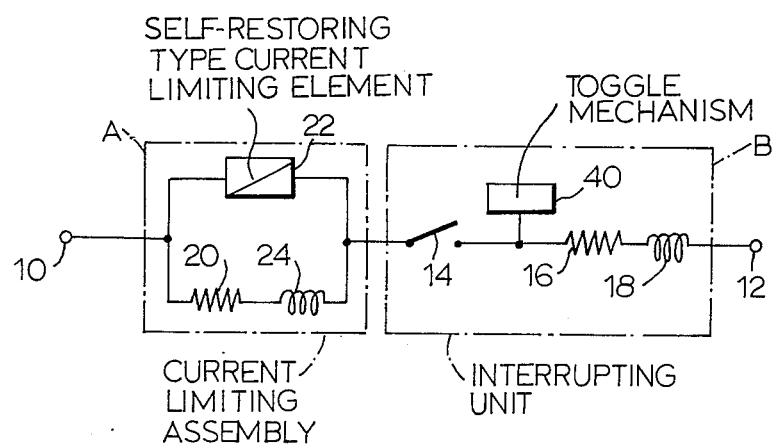
FIGS. 11 and 12 are schematic circuit diagrams of circuit interrupters including further improvements in the arrangement shown in FIG. 2.
Figure 12:
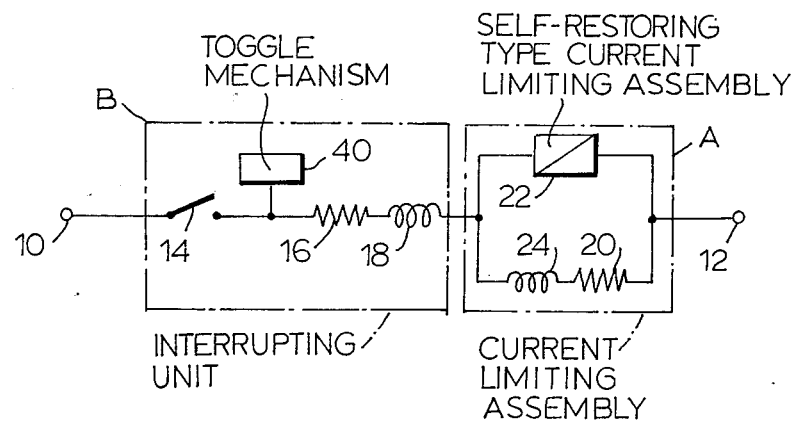

In FIGS. 11 and 12 wherein like reference numerals designate the components identical to those shown in FIG. 9, there are illustrated circuit interrupters including the flashover preventing means as above described. In FIG. 11, a self-restoring type current limiting element 22 is connected across a series combination of a resistor 20 and an on-limitation electromagnetic trip device 24 to form a current limiting assembly A which is, in turn, connected to one of two terminals, in this case the terminal 10. The current limiting assembly A is also connected to the other terminal 12 through an interrupting unit B. The interruptering unit B is formed of a pair of contacts 14, a thermally responsive trip device 16 and an electromagnetic trip device 18 serially interconnected in the named order with a toggle mechanism 40 operatively coupled to the contact pair 14.

The arrangement illustrated in FIG. 12 is different from that shown in FIG. 11 only in that the current limiting assembly A and the interrupting unit B have their positions reversed.

In both arrangements it is noted that the on-limitation electromagnetic trip device 24 is connected directly to the interrupting unit B without the resistor 20 interposed therebetween.

Figure 13:
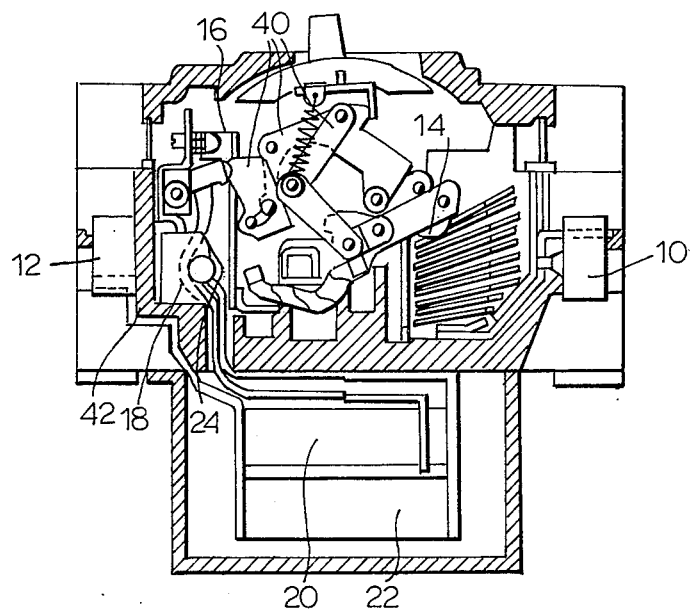
FIG. 13 is a side elevational view, partly in section, of a circuit interrupter actually embodying the circuit configuration shown in FIG. 11.

Either of the arrangements shown in FIGS. 11 and 12 can be actually formed into a structure as shown in FIG. 13 wherein like reference numerals designate the components identical to those shown in FIG. 11 or 12.

In the arrangement of FIG. 13, the terminals 10 and 12 are attached to a molder casing 42 of any suitable electrically insulating material and the resistor 20 and the self-restoring type current limiting element 22 are disposed within an electrically insulating casing attached to the bottom of the main body of the circuit interrupter.

With the arrangement of FIG. 13 having the circuit configuration as shown in FIG. 11 or 12, the thermally responsive trip device 16 is at the same potential as the contacts 14. That is, the toggle mechanism 40 is at an equal electric potential to the thermally responsive trip device 16. Therefore when a high voltage has been developed across the current limiting element 22 upon limiting a high shortcircuiting current, no flashover occurs across the toggle mechanism 40 and the thermally responsive trip device 16. The high voltage across the current limiting element 22 is also applied across the terminal 10 and the contact pair 14 in the arrangement of FIG. 11 and across the terminal 12 and the electromagnetic trip device 18 for the arrangement of FIG. 2. However the high voltage does not result in a flashover occurring across the contact pair and the adjacent component because the molded casing 42 can readily electrically insulate either of the contacts 14 from the adjacent component.

Thus it is seen that the circuit interrupter as shown in FIG. 13 can limit and interrupt shortcircuiting currents with no flashover occurring anywhere therein upon interrupting the shortcircuiting current.

While the present invention has been illustrated and described in conjunction with several preferred embodiments thereof it is to be understood that numerous changes and modifications may be resorted to without departing from the spirit and scope of the present invention. For example, the present invention is equally applicable to circuit interrupters including a fuse having no self-restoring property rather than the self-restoring type current limiting element. Such fuses are well known in the art and may be charged with silica sand. Also the present invention is applicable to electric apparatus comprising first and second electromagnetic means having a considerably different operating current from each other with satisfactory results.

What we claim is:

1. A circuit interrupter comprising, in combination, at least one pair of relatively separable contacts, a self-restoring type current limiting element and a first electromagnetic trip means connected in series circuit relationship with said contacts, a resistor connected across said self-restoring type current limiting element, and second electromagnetic trip means connected in a circuit with said resistor, said first and second electromagnetic trip means being operative independently to trip said contacts, said second electromagnetic trip means being operative only in response to the operation of said self-restoring type current limiting element.

2. A circuit interrupter as claimed in claim 1 wherein said first and second electromagnetic trip means include a common magnetic circuit including a single stationary iron core and a single movable iron piece.

3. A circuit interrupter as claimed in claim 1 wherein said first and second electromagnetic trip means include a common stationary iron core and a common movable iron piece biased to be normally spaced away from said stationary iron core by means of the action of a single spring, and wherein said first electromagnetic trip means has a winding inductively disposed around said stationary iron core and there is provided a magnetic bypath through which one portion of a magnetic flux produced by said winding flows.

4. A circuit interrupter as claimed in claim 1 wherein said first and second electromagnetic trip means include a common stationary iron core and a common movable iron piece biased to be normally spaced away from said stationary iron core by means of the action of a single spring and wherein said first electromagnetic trip means has a winding formed of a main conductor and a shunt conductor disposed in juxtaposed relationship with said stationary iron core therebetween, said shunt conductor having one portion of a load current flowing therethrough.

5. A circuit interrupter as claimed in claim 1 wherein said self-restoring type current limiting element along with said parallel resistor is connected to an interrupting unit including said contacts and said first electromagnetic trip means outside thereof.

* * * * *